United States Patent
Ōhara et al.

(10) Patent No.: US 6,204,211 B1
(45) Date of Patent: Mar. 20, 2001

(54) LUMINOUS GLASS CERAMICS

(75) Inventors: Kazuo Ōhara; Satoru Matsumoto; Naoyuki Goto, all of Sagamihara (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 0 days.

(21) Appl. No.: 09/585,442

(22) Filed: Jun. 2, 2000

Related U.S. Application Data

(62) Division of application No. 09/204,260, filed on Dec. 3, 1998.

(30) Foreign Application Priority Data

Dec. 22, 1997 (JP) .................................................... 9-353855
Oct. 23, 1998 (JP) .................................................. 10-302584

(51) Int. Cl.[7] .......................... C03C 10/02; C09K 11/08
(52) U.S. Cl. ................................ 501/10; 501/64; 501/69; 252/301.4 R; 252/301.4 F; 252/301.6 R; 252/301.6 F
(58) Field of Search ................................. 501/10, 64, 69; 252/310.4 R, 301.4 F, 301.6 R, 301.6 F

(56) References Cited

U.S. PATENT DOCUMENTS

| | | |
|---|---|---|
| 3,843,551 | 10/1974 | Muller et al. . |
| 3,928,229 | 12/1975 | Neuroth . |
| 4,032,351 | 6/1977 | Auzel et al. . |
| 4,929,387 | 5/1990 | Hayden et al. . |
| 5,336,643 | 8/1994 | Goto et al. . |
| 5,420,080 | 5/1995 | Wang et al. . |
| 5,446,007 | 8/1995 | Krashkevich et al. . |
| 5,482,628 | 1/1996 | Borrelli et al. . |
| 5,545,595 | 8/1996 | Wang et al. . |
| 5,561,089 | 10/1996 | Ishizaki et al. . |
| 5,591,682 | 1/1997 | Goto . |
| 5,952,253 | 9/1999 | Dejneka et al. . |
| 6,010,644 * | 1/2000 | Fu et al. ........................ 252/301.4 R |

FOREIGN PATENT DOCUMENTS

| | | |
|---|---|---|
| 0 587 979 A1 | 3/1994 | (EP) . |
| 0 640 571 A1 | 3/1995 | (EP) . |
| 9-175831 | 7/1997 | (JP) . |
| 1 811 512 | 4/1993 | (SU) . |

* cited by examiner

*Primary Examiner*—Karl Group
(74) *Attorney, Agent, or Firm*—Oliff & Berridge, PLC

(57) ABSTRACT

A luminous glass ceramic comprising a main crystallized phase of spinel or a solid solution of spinel including the components in weight %:

| | |
|---|---|
| $SiO_2$ | 30–65 |
| $Al_2O_3$ | 5–35 |
| MgO | 1–20 |
| BaO | 3–4 |
| ZnO | 5–35 |
| $TiO_2$ | 1–15 |
| $As_2O_3 + Sb_2O_3$ | 0–3 | wherein one or more rare earth elements are added to the glass ceramic in an amount of 0.1–30 wt %.

9 Claims, No Drawings

LUMINOUS GLASS CERAMICS

This is a Division of application Ser. No. 09/204,260 filed Dec. 3, 1998. The entire disclosure of the prior application is hereby incorporated by reference herein in its entirety.

BACKGROUND OF THE INVENTION

1. Field of the Invention

The present invention relates to luminous glass ceramics containing rare earth elements in a glass phase and/or a crystallized phase, wherein thermal conductivity, a character of thermal expansion, mechanical strength, of the luminous glass ceramics are improved and further having various emission wavelengths. In particular, the invention relates to luminous glass ceramics which can be suitably applied to an oscillation medium for laser oscillation, an excitation light filter or the like.

2. Description of Related Art

For materials which are used as the luminous materials in earlier technology, a glass material, a single crystal material, and a ceramic material have been known.

However, there are problems of the thermal conductivity and the thermal expansion in the glass material. That is, because the glass material has low thermal conductivity and a high coefficient of thermal expansion, when the glass material is subjected to irradiation by an excitation light with high intensity, there is a problem that the glass material breaks under thermal expansion thereof because occurred heat is hard to escape therefrom. When the glass material is used under such environmental circumstances, temperature of which is largely or rapidly changed, there is a problem that the glass material breaks under thermal fatigue thereof.

For example, the luminous glass material which is applied to the oscillation medium for laser oscillation or the wavelength conversion filter for excitation light of laser breaks under the thermal stress because the thermal conductivity of the glass material is low and the temperature distribution thereof becomes non-uniform when the glass material is subjected to irradiation by the laser.

On the other hand, there are problems for the single crystal material that it is difficult to uniformly dope the optically active element to the single crystal material and to produce a practically large size of product of the single crystal material. There is a problem that the ceramic material is liable to occur a light scattering caused by grain boundaries and pores, of the ceramic material, which is character thereof.

SUMMARY OF THE INVENTION

The present invention has been developed in view of the problems.

An object of the present invention is to provide luminous glass ceramics having the superior thermal properties, for example, being hard to break under the locally thermal expansion thereof or a heat shock, or the like, caused by the low thermal conductivity and by the high coefficient of thermal expansion, whereby the problems of the luminous materials in earlier technology can be solved.

Another object of the invention is to provide luminous glass ceramics which can solve the problems in the non-uniform distribution of the optically active element in the single crystal material in earlier technology and in the occurrence of the light scattering caused by the grain boundaries and the pores, of the ceramic material in the earlier technology.

Further object of the invention is to provide luminous glass ceramics which have formability which is similar to the glass and can be easily produced.

Still further object of the invention is to provide a method for producing luminous glass ceramics having the superior thermal properties above-described.

The inventors have made various efforts to solve the problems above-described. As the result, it is developed that the glass ceramics having a rare earth element in glass phase and/or crystallized phase, the main crystallized phase of which is $\beta$-quartz, $\beta$-quartz solid solution, spinel crystal, or solid solution of spinel crystal has superior thermal character, a little occurrence of the light scattering, formability which is similar to the glass so that it can be easily produced. Then, the inventors have achieved the invention.

In order to accomplish the above objects, in accordance with one aspect of the invention, a luminous glass ceramic having a thermal shock resistance $|\Delta t|°$ C. of not less than 150° C., wherein the thermal shock resistance $|\Delta t|$ is obtained by following equation, $|\Delta t|=[\text{flexural strength}]\times(1-[\text{Poisson's ratio}])/([\text{coefficient of thermal expansion}]\times[\text{Young's modulus}])$. The luminous glass ceramic can have thermal conductivity of not less than 1.1 W/(m·K) and comprise: a main crystallized phase selected from a group consisting of $\beta$-quartz and $\beta$-quartz solid solution; and a rare earth element contained in one selected from a group consisting of a glass phase, a crystallized phase, and both of the glass and crystallized phases, of the glass ceramic.

The $\beta$-quartz solid solution has another component which substitutes for a part of the $\beta$-quartz crystal and/or invades the $\beta$-quartz crystal. The $\beta$-quartz solid solution includes $\beta$-eucryptite, i.e., $\beta$-$Li_2O.Al_2O_3.2SiO_2$, wherein Li and Al are substitutes for Si in $\beta$-quartz crystal in a ratio of 1:1, and $\beta$-eucryptite solid solution wherein another component further substitutes for a part of the $\beta$-eucryptite and/or invades the $\beta$-eucryptite.

In the luminous glass ceramic, a grain size of a deposited crystal therein can be not more than 900 Å; a coefficient of thermal expansion thereof can be $-10\times10^{-7}$ to $+20\times10^{-7}/°$ C. in a temperature range of $-60°$ C. to $+160°$ C.; and a maximal variation of $\Delta L/L$ curve, which is a variation in relative length can be not more than $2\times10^{-5}$ in a temperature range of $-60°$ C. to $+160°$ C. The luminous glass ceramic can comprise the following components:

|  | Wt. % |
| --- | --- |
| $SiO_2$ | 50–65 |
| $P_2O_5$ | 0–10 |
| $Al_2O_3$ | 18–30 |
| $Li_2O$ | 2–6 |
| MgO | 0.2–6 |
| ZnO | 0–2 |
| CaO | 0–4 |
| BaO | 0.5–6 |
| $TiO_2$ | 1–4 |
| $ZrO_2$ | 1–4 |
| $As_2O_3 + Sb_2O_3$ | 0–2 | wherein a total amount of $SiO_2$ and $P_2O_5$ can be 50–70 wt. %, a ratio of $P_2O_5$ to $SiO_2$ can be 0–0.18, a ratio of $Al_2O_3$ to $SiO_2$ can be 0.30–0.55, one or more rare earth elements can be added to the glass ceramic on an oxide basis of 0.1–30 wt. % to an total amount of other components, and $Na_2O$ component, $K_2O$ component, and PbO component can not be essentially contained.

The luminous glass ceramic can be produced by a method comprising the steps of: melting a mixture of raw materials of the components; forming the melted mixture and annealing the formed mixture; subjecting the annealed product to a nucleating temperature of 650–820° C.; and subjecting the resulting product to a crystallizing temperature of 750–920° C.

The luminous glass ceramic can comprise: a main crystallized phase selected from a group consisting of a spinel crystal and solid solution of spinel crystal; and a rare earth element contained in one selected from a group consisting of a glass phase, a crystallized phase, and both of the glass and crystallized phases, of the glass ceramic.

In the application, the spinel crystal shows one or more types selected from a group consisting of (Mg and/or Zn)Al$_2$O$_4$, (Mg and/or Zn)$_2$TiO$_4$, and a mixture of solid solution between these two crystals.

The solid solution between two crystals shows one which consists only of the element contained in (Mg and/or Zn)Al$_2$O$_4$ and (Mg and/or Zn)$_2$TiO$_4$, wherein the element substitutes for a part of the two crystals and/or invades the two crystal.

The solid solution of spinel crystal has another component which substitutes for a part of the spinel crystal and/or invades the spinel crystal.

In the luminous glass ceramic a grain size of a deposited crystal therein can be not more than 300 Å; and a coefficient of thermal expansion thereof can be $25 \times 10^{-7}$ to $85 \times 10^{-7}/°$ C. in a temperature range of −60° C. to +160° C. The luminous glass ceramic can comprise the following components:

|  | Wt. % |
| --- | --- |
| SiO$_2$ | 30–65 |
| Al$_2$O$_3$ | 5–35 |
| MgO | 1–20 |
| BaO | 0.3–4 |
| ZnO | 5–35 |
| TiO$_2$ | 1–15 |
| As$_2$O$_3$ + Sb$_2$O$_3$ | 0–3 | wherein one or more rare earth elements can be added to the glass ceramic on an oxide basis of 0.1–30 wt. % to an total amount of other components, and alkali metal component and PbO component can not be essentially contained. The luminous glass ceramic can be produced by a method comprising the steps of: melting a mixture of raw materials of the components; forming the melted mixture and annealing the formed mixture; subjecting the annealed product to a nucleating temperature of 650–720° C.; and subjecting the resulting product to a crystallizing temperature of 750–880° C.

According to the luminous glass ceramics of the invention, because the luminous glass ceramics can be obtained by heat treatments on the original glasses after melting of the raw materials and forming the melted mixture, wherein the glasses can have composition of SiO$_2$—Al$_2$O$_3$—TiO$_2$—Re$_m$O$_n$ system, wherein Re can be one or more rare earth elements, not contain the PbO component and the obtained luminous glass ceramics can be close, so that the luminous glass ceramics can have superior homogeneity, low thermal expansivity, heat resistance, the thermal properties such as thermal conductivity, mechanical strength, and chemical durability. Further, it can be possible to drastically improve the melting property of the raw materials of the original glass with having the good valance of these superior properties of the luminous glass ceramics. Therefore, the luminous glass ceramics can have superior formability and easiness of production.

In particular, according to the luminous glass ceramics of the invention, the main crystallized phase of which is the spinel crystal or the solid solution of spinel crystal, because the luminous glass ceramics can not contain the alkali components practically, it can not be occurred the alkali elusion with the passage of time. Therefore, when the luminous glass ceramics are incorporated to an apparatus, the luminous glass ceramics can not lead to corrosion of the apparatus.

The luminous glass ceramic can be produced by a method comprising the steps of: melting a mixture of raw materials of the components; forming the melted mixture and annealing the formed mixture; and crystallizing a desired portion of the resulting product by a local heat-treatment.

The local heat-treatment can be carried out by laser or heater, or the like, which can locally heat the glass.

Because the glasses can be locally crystallized in desired portion with fine configuration by being subjected to irradiation by the laser light with desired configuration, it is possible to further improve the decorativity of the luminous glass ceramics.

In accordance with another aspect of the invention, a method for producing a luminous glass ceramic having a thermal shock resistance |Δt|° C. of not less than 150° C., thermal conductivity of not less than 1.1 W/(m·K) , a coefficient of thermal expansion of $-10 \times 10^{-7}$ to $+20 \times 10^{-7}/°$ C. in a temperature range of −60° C. to +160° C., the glass ceramic having the following composition:

|  | Wt. % |
| --- | --- |
| SiO$_2$ | 50–65 |
| P$_2$O$_5$ | 0–10 |
| Al$_2$O$_3$ | 18–30 |
| Li$_2$O | 2–6 |
| MgO | 0.2–6 |
| ZnO | 0–2 |
| CaO | 0–4 |
| BaO | 0.5–6 |
| TiO$_2$ | 1–4 |
| ZrO$_2$ | 1–4 |
| As$_2$O$_3$ + Sb$_2$O$_3$ | 0–2 | wherein a total amount of SiO$_2$ and P$_2$O$_5$ is 50–70 wt. %, a ratio of P$_2$O$_5$ to SiO$_2$ is 0–0.18, a ratio of Al$_2$O$_3$ to SiO$_2$ is 0.30–0.55, one or more rare earth elements are added to the glass ceramic on an oxide basis of 0.1–30 wt. % to an total amount of other components, the method comprises the steps of: melting a mixture of raw materials of the components; forming the melted mixture and annealing the formed mixture; subjecting the annealed product to a nucleating temperature of 650–820° C.; and subjecting the resulting product to a crystallizing temperature of 750–920° C.

In accordance with further aspect of the invention, a method for producing a luminous glass ceramic having a thermal shock resistance |Δt|° C. of not less than 150° C., thermal conductivity of not less than 1.1 W/(m·K), a coefficient of thermal expansion of $25 \times 10^{-7}$ to $85 \times 10^{-7}/°$ C. in a temperature range of −60° C. to +160° C., the glass ceramic having the following composition:

|  | Wt. % |
| --- | --- |
| SiO$_2$ | 30–65 |
| Al$_2$O$_3$ | 5–35 |

-continued

| | Wt. % |
|---|---|
| MgO | 1–20 |
| BaO | 0.3–4 |
| ZnO | 5–35 |
| TiO$_2$ | 1–15 |
| As$_2$O$_3$ + Sb$_2$O$_3$ | 0–3 | wherein one or more rare earth elements are added to the glass ceramic on an oxide basis of 0.1–30 wt. % to an total amount of other components, the method comprises the steps of: melting a mixture of raw materials of the components; forming the melted mixture and annealing the formed mixture; subjecting the annealed product to a nucleating temperature of 650–720° C.; and subjecting the resulting product to a crystallizing temperature of 750–880° C.

According to the method for producing the luminous glass ceramics of the invention, because the original glass can be produced by the method for producing glasses, and the glass ceramics can be obtained by forming the original glasses in various forms such as plate shape, thin plate shape, fiber shape, thin layer tube shape, or the like and subsequently being subjected to the heat treatments, it can be possible to produce the luminous glass ceramic of which degree of freedom of forming is very high.

PREFFERED EMBODIMENTS OF THE INVENTION

The luminous glass ceramics according to the embodiments of the present invention will be explained as follows.

At first, the reasons for limiting the range of the thermal shock resistance |Δt|, the thermal conductivity, the coefficient of thermal expansion, the maximal variation of ΔL/L curve, which is the variation in relative length, the composition, of the main crystallized phase and the starting or original glass, of the luminous glass ceramics to the range above-described will be explained as follows. The starting or original glass is not heat treated according to the invention. The original glasses with given heat treatment are glass ceramics according to the invention.

The thermal shock resistance |Δt| is an index to a heat-resistance impact, which is represented by the following equation, |Δt|=[flexural strength]×(1−[Poisson's ratio])/ ([coefficient of thermal expansion]×[Young's modulus]) and which is stated in "New Glass Handbook" edited by editorial committee of New Glass Handbook, published by Maruzen, pages 405–406. It is judged that the larger the thermal shock resistance becomes, the larger the resistance to the difference in temperature, of the glass ceramics or the glasses becomes.

Applicant carried out various tests and found that it is required for the glass ceramics or the glasses that the value of |Δt| thereof is not less than 150° C. to be applied to the oscillation medium for laser oscillation or the wavelength conversion filter for excitation light of laser, which is subjected to irradiation by the high intense excitation light. Preferably, it is required the value of |Δt| is not less than 200, more preferably, not less than 250° C. The thermal shock resistance of almost luminous glasses which are not crystallized in earlier technology are not more than 100° C., and even the largest value thereof is not more than 130° C.

On the contrary, the luminous glass ceramics of the invention have the thermal shock resistance which is remarkably larger than the glasses in the earlier technology. That is, the characteristics of the heat-resistance impact of the luminous glass ceramics of the invention is very excellent because of having the thermal shock resistance |Δt| which is not less than 150° C. Therefore, even though the luminous glass ceramics of the invention are subjected to irradiation by the high intense excitation light, the luminous glass ceramics can resist breakage under the locally thermal expansion thereof caused by the heat generation. The luminous glass ceramics can also resist the heat shock, the excitation light irradiated intermittently, or the thermal fatigue with the passage of time.

The thermal conductivity of the luminous glass material in earlier technology is low, such as a value of not more than 1.1 W/(m·K). Accordingly, when the luminous glass material is subjected to irradiation by the high intense excitation light for long hours, because the luminous glass material is hard to diffuse the occurred heat, the temperature of the luminous glass material in the earlier technology becomes locally high and finally breaks under the strain occurred by the thermal expansion.

On the contrary, because all of the luminous glass ceramics of the invention have the thermal conductivity which is not less than 1.1 W/(m·K), it is easier for the luminous glass ceramics to diffuse the occurred heat and to suppress the local strain compared with the luminous glass material in the earlier technology.

The luminous glass ceramics according to the embodiment of the invention, the main crystallized phase of which is β-quartz or β-quartz solid solution will be explained as follows.

These crystallized phases are essential for achieving the low expansion coefficient, of the luminous glass ceramics. It is possible to reduce the local strain due to the thermal expansion under the irradiation by the high intense excitation light and to prevent the luminous glass ceramics from breaking, because the luminous glass ceramics have these crystallized phases. Further, because the luminous glass ceramics have the low rate of thermal expansion, the thermal shock resistance becomes very large. Therefore, the luminous glass ceramics are hard to break and have resistance to the thermal fatigue when the luminous glass ceramics are repeatedly subjected to the irradiation by the high intense excitation light.

The content of the crystallized phase which is the β-quartz or the β-quartz solid solution, is preferably not less than 30 wt. %, more preferably not less than 50 wt. %, which is calculated from a peak area obtained by X-ray diffractometry (powder method).

Regarding the grain size of the deposited crystal in the glass ceramics, it is important to maintain the transparency of the glass ceramics. A difference in a refractive index between the glass phase and the deposited crystal is an important factor for the grain size. That is, when the difference in the refractive index between them is large, it is required to make the grain size of the crystal small to obtain the transparency of the luminous glass ceramics. On the contrary, when the difference in the refractive index between them is small, it is possible to maintain the transparency of the luminous glass ceramics even if the grain size of the deposited crystal is large.

In the case that the main crystallized phase is the β-quartz or the β-quartz solid solution, in the glass ceramics according to the embodiment of the invention, the refractive index represented by "nd", of the glass phase is 1.52 to 1.55, while the refractive index nd of the β-quartz crystal or the β-quartz solid solution crystal is 1.53 to 1.54. The differences Δnd in refractive index between them are 0.01 to 0.02 which are very small. Therefore, it is required for the glass ceramics to have the deposited crystal, grain size of which is not more than 900 angstrom (Å) which is relatively large to maintain the transparency of the luminous glass ceramics.

Even if Δnd is small, when the grain size of the deposited crystal is more than 900 Å, the transparency of the glass ceramics becomes significantly reduced. In particular, when the glass ceramics are applied to the oscillation medium for laser oscillation in such a shape like a thick plate, a block or the like, the transparency of the glass ceramics becomes an important factor. Therefore, it is preferable that the grain size of the deposited crystal is not more than 850 Å, more preferably not more than 800 Å.

The coefficient of thermal expansion is reduced in the glass ceramics according to the embodiment of the invention, the main crystallized phase of which is the β-quartz or the β-quartz solid solution, and the maximal variation in relative length, of that is made small, to prevent the breakage of the glass which is caused by the strain under the thermal expansion.

The coefficient α of thermal expansion values of $-10 \times 10^{-7}$ to $+20 \times 10^{-7}/°$ C., and the maximal variation of ΔL/L curve, which is the variation in relative length values of $\leq 2 \times 10^{-5}$, in the range of $-60°$ C. to $+160°$ C. are preferable. It is possible to prevent the glass ceramics having such values within these ranges from breaking under the thermal expansion caused by being subjected to irradiation by the high intense excitation light. It is more preferable that the coefficient α of thermal expansion of $-7 \times 10^{-7}$ to $+18 \times 10^{-7}/°$ C., and the maximal variation of ΔL/L curve of $\leq 1.8 \times 10^{-5}$, most preferably, the coefficient α of thermal expansion of $-5 \times 10^{-7}$ to $+15 \times 10^{-7}/°$ C., and the maximal variation of ΔL/L curve of $\leq 1.5 \times 10^{-5}$.

The compositions of the luminous glass ceramics according to the embodiment of the invention, the main crystallized phase of which is the β-quartz or the β-quartz solid solution will be explained as follows.

The luminous glass ceramics do not have to contain PbO, $Na_2O$, and $K_2O$ practically, because PbO has unfavorable effects on humans and the environment, and because when the luminous glass ceramics contain $Na_2O$ and $K_2O$, the alkali components are eluted therefrom with being applied the heat or the passage of time.

The $SiO_2$ component is important as a component forming the main crystallized phase and as the principal glass former. When the $SiO_2$ content is less than 50 wt. %, the grain size of the crystal in obtained glass ceramics becomes coarse and transparency thereof is deteriorated. On the other hand, when the $SiO_2$ content is more than 65 wt. %, the raw materials of the original glass are difficult to melt and the glass melt is difficult to refine so that the chemical homogeneously of the product is deteriorated. Preferable range of the $SiO_2$ content is 52–62 wt. %, more preferably, 55–61 wt. %.

When the $P_2O_5$ component is coexisted with the $SiO_2$ component, $P_2O_5$ makes the curve of the ΔL/L flat and stable, and improves the melting of the raw materials of the glass and the refining of the glass melt. However, the $P_2O_5$ content is more than 10 wt. %, the grain size of the crystal in the glass ceramics becomes coarse and transparency of the glass ceramics is remarkable deteriorated. Preferable range of the $P_2O_5$ content is 0–8 wt. %, more preferably, 3–7 wt. %.

For remarkably improvement of flattening the curve of the ΔL/L and properties of the melting and the refining, the preferable total amount of $SiO_2+P_2O_5$ is 50–70 wt. %. More preferable range of that is 56–70 wt. %, especially, 61–66 wt. %.

In addition, preferable range of the weight ratio of $P_2O_5$ component to $SiO_2$ component is 0–0.18, more preferably 0–0.15, most preferably, 0.06–0.12.

The $Al_2O_3$ component is for improving the resistance to devitrification of the glass. When the $Al_2O_3$ content is less than 18 wt. %, it is difficult to melt the raw materials of the original glass and the resistance to devitrification thereof is deteriorated. On the other hand, when the $Al_2O_3$ content is more than 30 wt. %, it is difficult to melt the raw materials of the original glass and the resistance to devitrification thereof is deteriorated. Preferable range of the $Al_2O_3$ content is 20–27 wt. %, especially, 22.5–25 wt. %.

For improving the resistance to devitrification of the glass, the preferable range of the weight ratio of the $Al_2O_3$ component to $SiO_2$ component is 0.30–0.55. More preferable range of that is 0.34–0.49, especially, 0.36–0.42.

$Li_2O$, MgO, and ZnO are important because each of them contributes to the formation of the β-quartz crystal or the β-quartz solid solution crystal. These three components have effects of flattening and stabling the curve of the ΔL/L of the glass ceramics, and improving the refining of the glass melt, coupled with the $SiO_2$ component and the $P_2O_5$ component which has limited weight ratio to the $SiO_2$ component.

When the $Li_2O$ content is less than 2 wt. %, the property of melting of the raw materials of the original glass is deteriorated so that the homogeneously of the product is deteriorated, additionally, it is difficult to deposit the desired fine crystal. On the other hand, when the $Li_2O$ content is more than 6 wt. %, the effects described above can not be obtained, the grain size of the deposited crystal becomes coarse and the transparency of the glass ceramics is remarkably deteriorated. Preferable range of the $Li_2O$ content is 2.5–5.5 wt. %, more preferably, 3–5 wt. %.

When the MgO content is less than 0.2 wt. %, the effects described above can not be obtained, additionally, the property of melting of the raw materials of the original glass is deteriorated so that the homogeneously of the product is deteriorated. On the other hand, when the MgO content is more than 6 wt. %, the effects described above can not be obtained, additionally, it is difficult to deposit the desired crystallized phase. Preferable range of the MgO content is 0.3–5 wt. %, more preferably, 0.5–4 wt. %.

When the ZnO content is more than 2 wt. %, the effects described above can not be obtained, additionally, the resistance to devitrification of the glass is deteriorated, and it is difficult to deposit the desired crystallized phase. Preferable range of the ZnO content is 0.1–1.7 wt. %, more preferably, 0.2–1.5 wt. %.

Further, it is more preferable to have range of 4–6.5 wt. % of the total amount of the three components of $Li_2O+$MgO+ZnO.

Two components of CaO and BaO basically form the residual matrix glass excepted the crystallized phase of the β-quartz or the β-quartz solid solution. These components are important for fine adjustment of the matrix glass phase to improve the flattening and the stabling, of the curve of the ΔL/L of the glass ceramics, and refining of the glass melt.

When the CaO content is more than 4 wt. %, the effects described above can not be obtained, additionally, the resistance to devitrification of the glass is deteriorated. Preferable range of the CaO content is 0–3 wt. %, more preferably, 0–2 wt. %.

When the BaO content is less than 0.5 wt. %, the effects described above can not be obtained, while when the BaO content is more than 6 wt. %, the resistance to devitrification of the glass and the property of melting of the raw materials of the original glass are deteriorated. Preferable range of the Bao content is 0.5–5 wt. %, more preferably, 0.5–4 wt. %.

The $TiO_2$ and $ZrO_2$ components are essential as nucleating agents of the crystal to be deposited. When each of the $TiO_2$ and $ZrO_2$ content is less than 1 wt. %, it is difficult to deposit the desired crystal, while when each of the $TiO_2$ and $ZrO_2$ content is more than 4 wt. %, the resistance to devitrification of the glass becomes low so that the transparency of the glass ceramics is remarkably deteriorated. Preferable range of each of the $TiO_2$ and $ZrO_2$ content is 1.5–4 wt. %, more preferably, 1.5–3 wt. %, respectively.

$As_2O_3$ and $Sb_2O_3$ can be added as refining agents in the melting process of the raw materials of the original glass, however, the total amount of these are limited up to 2 wt. %. Preferable range of the total amount of the $AS_2O_3$ and the $Sb_2O_3$ contents is 0.3–2 wt. %, more preferably, 0.3–1.5 wt. %.

Rare earth element components are important as optically active components. Added amount of one or more rare earth components on an oxide basis must be 0.1–30% in the ratio by weight to the total amount of other glass ceramics components described above. Preferable range of the added amount of the rare earth components on the oxide basis is 0.1–25 wt. %, more preferably, 0.1–20 wt. %.

The preferable elements which have particular emission property among the rare earth element components are one or more types selected from the group consisting of Nd, Eu, Dy, Er, Tb, Ce, Yb, and Sm. The rare earth element components which are added to the glass ceramics should be carefully selected in the types and amount, thereof when the glass ceramics are used for being applied to the medium for laser oscillation, the wavelength conversion filter for laser excitation light, the scintillator for radiation, the cover glass for the solar battery, the fluorescent substance for illuminating or displaying, the electro luminescent materials, the ultraviolet sensor materials, or the like to prevent the quenching, that is, the decrease of emission efficiency when the optically active components are high concentration or by interactions of the optically active components with each other.

It is also possible to add other ingredients to improve the property of melting of the raw materials of the original glass and transmittance of the glass ceramics in the range of maintaining the desired property of the glass ceramics of the invention. For example, the ingredients which are SrO, $B_2O_3$, $F_2$, $La_2O_3$, $Bi_2O_3$, $WO_3$, $Y_2O_3$, and $SnO_2$, can be added in a total amount of one or more types thereof up to 2 wt. %, the coloring components which are CoO, NiO, $MnO_2$, $Fe_2O_3$, $Cr_2O_3$, or the like can be added in a total amount of one or more than two types thereof up to 2 wt. %, respectively.

As for the nucleating temperature of the luminous glass ceramics according to the embodiment of the invention, the main crystallized phase of which is the β-quartz or the β-quartz solid solution, when the nucleating temperature is lower than 650° C., the desired crystallized phase is not deposited. On the other hand, when the temperature of nucleation is higher than 820° C., it is impossible to obtain the crystallized phase having the crystal grain size distribution which is homogeneous because anomalous growth of the deposited crystal is occurred. Preferable range of the nucleating temperature is 650–820° C., more preferably, 680–800° C.

As for the crystallizing temperature of the glass ceramics, when the temperature of crystallization is lower than 750° C., the crystals are not grown to the desired grain size. On the other hand, when the crystallizing temperature is higher than 920° C., the crystal grain is grown too large to lose transparency, the mechanical strength, that is, flexural strength becomes low, and it is difficult to obtain the desired thermal expansivity. Preferable range of the crystallizing temperature is 750–920° C., more preferably, 770–900° C.

The luminous glass ceramics according to an embodiment of the invention, the main crystallized phase of which is spinel crystal or solid solution of spinel crystal will be explained as follows.

These crystallized phases are essential to improve the flexural strength of the luminous glass ceramics, while the luminous glass ceramics, the main crystallized phase of which is spinel crystal or solid solution of spinel crystal do not have so low coefficient of thermal expansion compared with the glass ceramics, the main crystallized phase of which is β-quartz or β-quartz solid solution above-described. The spinel crystal or the solid solution of spinel crystal is resistant to the strain. Further, the spinel crystal or the solid solution of spinel crystal can improve the thermal shock resistance of the glass ceramics. Therefore, even though the glass ceramics are subjected to the irradiation by the high intense excitation light of laser, it can resist the breakage under the locally thermal expansion thereof, the heat shock, the intermittent irradiation by excitation light, or the thermal fatigue with the passage of time. Preferably, the content of the crystallized phase of the spinel crystal or the solid solution of spinel crystal is not less than 15 wt. %, more preferably, not less than 20 wt. %, which is calculated from a peak area obtained by X-ray diffractometry (powder method).

A crystal grain size of the deposited crystal in the glass ceramics, the main crystallized phase of which is the spinel crystal or the solid solution of spinel crystal will be explained as follows.

The refractive index "nd", of the glass phase of the glass ceramics is approximately 1.59, while the refractive index nd of the deposited crystal is approximately 1.75. The differences Δnd in the refractive index between them are 0.16 which are larger than that of the glass ceramics, the main crystallized phase of which is the β-quartz or the β-quartz solid solution. Accordingly, it is required to make the grain size of the deposited crystal small to maintain the transparency of the luminous glass ceramics because of the reason above-described.

Therefore, it is required for the glass ceramics to have the deposited crystal, the grain size of which is not more than 300 angstrom (Å) to maintain the transparency of the luminous glass ceramics. When the grain size of the deposited crystal is more than 300 Å, the transparency of the glass ceramics becomes significantly lower. In particular, it is difficult to apply the glass ceramics to the oscillation medium for laser oscillation in such a shape like a thick plate, a block or the like. Therefore, it is preferable that the grain size of the deposited crystal is not more than 280 Å, more preferably, not more than 250 Å.

Regarding the coefficient of thermal expansion of the glass ceramics according to the embodiment of the invention, the main crystallized phase of which is the spinel crystal or the solid solution of spinel crystal will be explained as follows. In the glass ceramics, the coefficient of thermal expansion is made relatively high compared with the glass ceramics, the main crystallized phase of which is the β-quartz or the β-quartz solid solution, while the flexural strength is improved to prevent the break of the glass which is caused by the strain via the thermal expansion.

The coefficient α of thermal expansion values of $+25 \times 10^{-7}$ to $+85 \times 10^{-7}$/° C. in the temperature range of $-60°$ C. to $+160°$ C., of the glass ceramics are preferable. The reason why these values are preferable is that even if the flexural strength is improved, the glass ceramics are liable to break caused by the thermal expansion when the coefficient of thermal expansion value is more than $+85 \times 10^{-7}$/° C. In the glass ceramics, the main crystallized phase of which is the spinel crystal or the solid solution of spinel crystal, it is difficult to make the coefficient of thermal expansion be lower than $+25 \times 10^{-7}$/° C. because of the property due to the deposited crystal. It is more preferable that the coefficient α of thermal expansion is $+30 \times 10^{-7}$ to $+80 \times 10^{-7}$/° C., most preferably, $+35 \times 10^{-7}$ to $+75 \times 10^{-7}$/° C.

The compositions of the luminous glass ceramics according to the embodiment of the invention, the main crystallized phase of which is the spinel crystal or the solid solution of spinel crystal will be explained as follows.

The luminous glass ceramics do not have to contain PbO, $Li_2O$, $Na_2O$, or $K_2O$ practically, because PbO has unfavorable effects on human and the environment, and because when the luminous glass ceramics contain $Li_2O$, $Na_2O$ or $K_2O$, the alkali components are eluted with being applied the heat or the passage of time.

When the $SiO_2$ content is less than 30 wt. %, the grain size of the crystal in obtained glass ceramics is liable to become coarse and the chemical durability and hardness, thereof becomes low. On the other hand, when the $SiO_2$ content is more than 65 wt. %, it is difficult to melt the raw materials of the original glass. Preferable range of the $SiO_2$ content is 35–65 wt. %, more preferably, 40–62 wt. %.

The $Al_2O_3$ component is important for forming the spinel crystal or the solid solution of spinel crystal, which is the main crystallized phase of the glass ceramics. When the $Al_2O_3$ content is less than 5 wt. %, the chemical durability and hardness, of the produced glass ceramics become low. On the other hand, when the $Al_2O_3$ content is more than 35 wt. %, the resistance to devitrification of the original glass becomes low, the melting property of the raw materials of the original glass is deteriorated, and it is difficult to obtain the homogenous glasses. Preferable range of the $Al_2O_3$ content is 10–30 wt. %, more preferably, 15–25 wt. %.

ZnO component is very important because the ZnO and the $Al_2O_3$ contents form the main crystallized phase of the spinel crystal or the solid solution of spinel crystal by heat treatment of the original glass, so that the strength, the hardness, the fire resistance, and the heat resistance, of the produced glass ceramics are improved. Further, these components also have the efficiency to maintain the transparency of the glass ceramics. However when the ZnO content is less than 5 wt. %, it is difficult to obtain the efficiency above-described. On the other hand, when the Zno content is more than 35 wt. %, the original glass is unstable. Preferable range of the ZnO content is 8–30 wt. %, more preferably, 10–25 wt. %.

The MgO component is important for forming the main crystallized phase of the spinel crystal or the solid solution of spinel crystal. When the MgO content is less than 1 wt. %, the original glass is unstable and the property of melting of the raw materials of the original glass is deteriorated. Further, the hardness of the produced glass ceramics becomes low. On the contrary, when the MgO content is more than 20 wt. %, the grain size of the crystal in obtained glass ceramics becomes coarse and the transparency thereof is lost so that the resistance to devitrification of the original glass becomes low. Preferable range of the MgO content is 3–18 wt. %, more preferably, 5–18 wt. %.

The BaO component has the effect to improve the property of melting of the raw materials of the original glass. The range of the BaO content should be 0.3–4 wt. % to obtain the effect and to prevent coarsening of the crystal grain size under the heat treatment. Preferable range of the BaO content is 0.3–3.5 wt. %, more preferably, 0.5–3 wt. %.

The $TiO_2$ component is important for forming the main crystallized phase of the spinel crystal or the solid solution of spinel crystal, further essential as nucleating agents of the crystal to be deposited. When the $TiO_2$ content is less than 1 wt. %, it is impossible to deposit the desired crystallized phase, while when the $TiO_2$ content is more than 15 wt. %, the original glass is unstable and the resistance to devitrification of the glass becomes remarkably low. Preferable range of the $TiO_2$ content is 2–11 wt. %, more preferably, 3–9 wt. %.

$As_2O_3$ and/or $Sb_2O_3$ components can be added as refining agents in the melting process of producing the original glass, however, the total amount of one or more thereof is limited up to 3 wt. %. Preferable range of the total amount of the $As_2O_3$ and the $Sb_2O_3$ content is 0.1–2 wt. %, more preferably, 0.3–1.5 wt. %.

Rare earth components are important as optically active components for the glass ceramics, the main crystallized phase of which is the spinel crystal or the solid solution of spinel crystal, like the glass ceramics, the main crystallized phase of which is β-quartz or β-quartz solid solution. Added amount of one or more than two rare earth components on an oxide basis must be 0.1–30% by weight to the total amount of other glass ceramics components above-described. Preferable range of the added amount of the rare earth components is 0.1–25 wt. %, more preferably, 0.1–20 wt. %.

The preferable elements which have a particular emission property among the rare earth element components are the same elements as that in the case of the glass ceramics, the main crystallized phase of which is β-quartz or β-quartz solid solution.

It is also possible to add other ingredients to improve the properties of melting of the raw materials of the original glass and transmittance of the glass ceramics in the range of maintaining the desired properties of the glass ceramics of the invention, like the case in the glass ceramics, the main crystallized phase of which is β-quartz or β-quartz solid solution. For example, the ingredients which are SrO, $B_2O_3$, $F_2$, $La_2O_3$, $Bi_2O_3$, $WO_3$, $Y_2O_3$, and $SnO_2$ can be added in a total amount of one or more types up to 2 wt. %, the coloring components which are CoO, NiO, $MnO_2$, $Fe_2O_3$, $Cr_2O_3$, or the like can be added in a total amount of one or more than two types up to 2 wt. %, respectively.

As for the nucleating temperature of the luminous glass ceramics according to the embodiment of the invention, the main crystallized phase of which is the spinel crystal or the solid solution of spinel crystal, when the nucleating temperature is lower than 650° C., the desired crystallized phase is not deposited. On the other hand, when the nucleating temperature thereof is higher than 720° C., it is impossible to obtain the crystallized phase having the crystal grain size distribution which is homogeneous because anomalous growth of the deposited crystal is occurred. Preferable range of the nucleating temperature thereof is 650–720° C., more preferably, 680–700° C.

As for the crystallizing temperature of the glass ceramics, when the crystallizing temperature thereof is lower than 750° C., the crystallized phase can not be grown to the desired grain size. On the other hand, when the crystallizing temperature thereof is higher than 880° C., the crystal grain thereof is grown too large to lose the transparency, the mechanical strength, that is, flexural strength becomes low, and it is difficult to obtain the desired thermal expansivity. Preferable range of the crystallizing temperature of the glass ceramics is 750–880° C., more preferably, 770–860° C.

The method for producing the luminous glass ceramics according to the embodiment of the invention has the steps of mixing the raw materials of the original glass to have the composition above-described, melting the raw materials, thereafter, forming the melted mixture, and annealing the formed mixture. As the result, the original glass is obtained. Then, the original glass is subjected to the heat treatments of two steps. That is, the original glass is subjected to the first heat treatment at the nucleating temperature of crystal to nucleate the crystal to be deposited, subsequently, subjected to the second heat treatment at the crystallizing temperature so that the deposited crystal is grown. As the result, the glass ceramics, in other words, crystallized glasses which contain the rare earth elements as the optically active components can be obtained.

In the heat treatments of the two steps, it is not required to rise the temperature of the whole glass to the nucleating temperature and the crystallizing temperature. For example, the temperature of a desired portion of the glass can be locally risen to the nucleating temperature and the crystallizing temperature, by subjecting the desired portion of the glass to irradiation by the laser light or by using a heater which can locally heat the glass. Then, only desired portion of the glass can be crystallized.

EXAMPLES

The invention is further explained below with reference to examples. However, the invention is, of course, not limited to the examples.

Tables I and II show compositions by weight % and some properties, of the luminous glass ceramics according to the examples 1-1 to 1-5 of the invention. The properties given in Tables I and II are the nucleating temperature, the nucleating time, the crystallizing temperature, the crystallizing time, the thermal conductivity, the coefficient of thermal expansion, the maximal variation of ΔL/L curve, which is the variation in relative length, the main crystallized phase, the light transmittance at wavelength of 587.56 nm when the glass ceramics have the thickness of 10 mm, the wavelength of the excitation light, and the wavelength of main emission and the emission color when the excitation light at the wavelength is irradiated to the glass ceramics, of the glass ceramics, and the melting temperature and the melting time, of the raw materials of the original glass when the glass ceramics are produced.

TABLE I

| | EXAMPLES | | |
|---|---|---|---|
| | 1-1 | 1-2 | 1-3 |
| Composition (wt. %) | | | |
| $SiO_2$ | 60.0 | 55.0 | 58.1 |
| $P_2O_5$ | 6.0 | 8.0 | — |
| $Al_2O_3$ | 22.5 | 24.0 | 27.1 |
| $Li_2O$ | 4.5 | 4.0 | 4.4 |
| MgO | 0.5 | 1.0 | 1.4 |
| ZnO | 0.2 | 0.5 | 0.8 |
| CaO | — | 1.0 | — |

TABLE I-continued

| | EXAMPLES | | |
|---|---|---|---|
| | 1-1 | 1-2 | 1-3 |
| BaO | 0.8 | 1.0 | 2.9 |
| $TiO_2$ | 2.5 | 2.5 | 2.4 |
| $ZrO_2$ | 2.0 | 2.0 | 1.9 |
| $As_2O_3$ | 1.0 | 1.0 | 1.0 |
| $P_2O_5/SiO_2$ (wt %/wt %) | 0.10 | 0.15 | 0.00 |
| $Al_2O_3/SiO_2$ (wt %/wt %) | 0.38 | 0.44 | 0.47 |
| Ratio (wt. %) of added amount of the rare earth oxide to total amount of the others | $Tb_4O_7$:2.0 | $CeO_2$:2.0 | $CeO_2$:1.0 $Eu_2O_3$:1.0 |
| Heat treatment | | | |
| Nucleating temperature (° C.) | 760 | 700 | 760 |
| Nucleating time (hr) | 5 | 5 | 5 |
| Crystallizing temperature (° C.) | 840 | 780 | 840 |
| Crystallizing time (hr) | 5 | 5 | 5 |
| Thermal conductivity (W/(m · K)) | 1.6 | 1.6 | 1.7 |
| Coefficient of thermal expansion α × $10^{-7}$/° C. (−60° C. to +160° C.) | −4 | 4.2 | −6.2 |
| Maximal variation in relative length ΔL/L(× $10^{-5}$) | 0.77 | 0.81 | 0.83 |
| Main crystallized phase | β-quartz solid solution | β-quartz solid solution | β-quartz solid solution |
| Transmittance in thickness of 10 mm (%) (at 587.56 nm) | 82 | 63 | 77 |
| Wavelength of excitation light (nm) | 365 | 365 | 365 |
| Wavelength of main emission (nm) | 490, 550 | 405 | 405, 565, 600 |
| Emission color | Green | Blue | Reddish violet |
| Melting temperature (° C.) | 1520 | 1510 | 1540 |
| Melting time (hr) | 8 | 8 | 8 |

TABLE II

| | EXAMPLES | |
|---|---|---|
| | 1-4 | 1-5 |
| Composition (wt. %) | | |
| $SiO_2$ | 53.5 | 53.5 |
| $P_2O_5$ | — | — |
| $Al_2O_3$ | 20.0 | 20.0 |
| $Li_2O$ | — | — |
| MgO | 6.0 | 6.0 |
| ZnO | 12.0 | 12.0 |
| CaO | — | — |
| BaO | 2.0 | 2.0 |
| $TiO_2$ | 6.0 | 6.0 |
| $ZrO_2$ | — | — |
| $As_2O_3$ | 0.5 | 0.5 |
| $P_2O_5/SiO_2$ (wt %/wt %) | 0.00 | 0.00 |

TABLE II-continued

|  | EXAMPLES | |
| --- | --- | --- |
|  | 1-4 | 1-5 |
| Al$_2$O$_3$/SiO$_2$ (wt %/wt %) | 0.37 | 0.37 |
| Ratio (wt. %) of added amount of the rare earth oxide to total amount of the others | Dy$_2$O$_3$:2.0 | Sm$_2$O$_3$:1.0 |
| Heat treatment |  |  |
| Nucleating temperature (° C.) | 695 | 695 |
| Nucleating time (hr) | 10 | 10 |
| Crystallizing temperature (° C.) | 845 | 845 |
| Crystallizing time (hr) | 2 | 2 |
| Thermal conductivity (W/(m · K)) | 1.4 | 1.4 |
| Coefficient of thermal expansion α × 10$^{-7}$/° C. (−60° C. to +160° C.) | 47 | 49 |
| Maximal variation in relative length ΔL/L (× 10$^{-5}$) | — | — |
| Main crystallized phase | Spinel | Spinel |
| Transmittance in thickness of 10 mm (%) (at 587.56 nm) | 86 | 87 |
| Wavelength of excitation light (nm) | 365 | 365 |
| Wavelength of main emission (nm) | 485, 575 | 565, 600, 650 |
| Emission color | Yellow | Orange |
| Melting temperature (° C.) | 1500 | 1500 |
| Melting time (hr) | 8 | 8 |

The glasses according to the examples 1-1 to 1-5 shown in Tables I and II are produced as follows.

The raw materials which are such as oxides, carbonates, nitrates, or the like are mixed to have the compositions in Tables I and II, respectively. The resulting mixture about 1 kg in weight is charged in a general apparatus for melting, such as a platinum crucible, melted, and homogenized by agitating at the temperature of about 1450–1600° C., for about 5–72 hours. The homogenized mixture is cast in, e.g., iron molds, put in an electric furnace of 650–750° C., annealed and cooled with lowering the temperature of the electric furnace at a rate of about 25° C./hour to room temperature, thus formed original glasses are obtained. Thereafter, for the glass ceramics, the main crystallized phase of which is β-quartz or β-quartz solid solution, the original glasses are heat-treated for about 5–40 hours at a temperature of 650–820° C. for nucleating of crystal. After nucleating of crystal, the glasses are heated and heat-treated for about 5–30 hours at a temperature of 750–920° C. and crystallized. For the glass ceramics, the main crystallized phase of which is spinel crystal or solid solution of spinel crystal, the original glasses are heat-treated for about 5–30 hours at a temperature of 650–720° C. for nucleating of crystal. After nucleating of crystal, the glasses are heated and heat-treated for about 2–20 hours at a temperature of 750–880° C. and crystallized. As the result, the luminous glass ceramics which has desired properties are obtained.

In the compositions of the components of the luminous glass ceramics according to the examples of the invention, the values of SiO$_2$+P$_2$O$_5$, P$_2$O$_5$/SiO$_2$, and Al$_2$O$_3$/SiO$_2$ are for examples, in both of the examples of 1-1 and 2-3, SiO$_2$+P$_2$O$_5$=66.0, P$_2$O$_5$/SiO$_2$=0.1, and Al$_2$O$_3$/SiO$_2$=0.375.

Each obtained glass ceramics have the transparency. The grain size of deposited crystals in the glass ceramics according to the examples 1-1 to 1-3 is about 800 Å, while the grain size of that in the glass ceramics according to the examples 1-4 and 1-5 is not more than 250 Å.

The glass ceramics according to the examples 1-1 to 1-5 have the light transmittance of at least not less than 60%, at wavelength of 587.56 nm, further, some of them have the light transmittance of not less than 80%. Therefore, the glass ceramics according to these examples have sufficient transparency. The glass ceramics emit light when the glass ceramics are subjected to irradiation by the excitation light at wavelength of 365 nm. Accordingly, it is shown that these glass ceramics according to the examples have optical activity.

The luminous glass ceramics according to the examples 1-1 to 1-5 have the thermal conductivity of not less than 1.1 W/(m·K).

The coefficients of thermal expansion of the luminous glass ceramics according to the examples 1-1 to 1-3 are within −10×10$^{-7}$ to +20×10$^{-7}$/° C. and the maximal variation of ΔL/L curve thereof is not more than 2×10$^{-5}$, in the temperature range of −60° C. to +160° C.

The coefficients of thermal expansion of the luminous glass ceramics according to the examples 1-4 and 1-5 are within 25×10$^{-7}$ to 85×10$^{-7}$/° C., in the temperature range of −60° C. to +160° C.

Tables III and IV show compositions by weight % of glass and some properties, of the luminous glass ceramics according to the examples 2-1 to 2-4 of the invention, which exhibit the laser oscillation. The properties given in Tables III and IV are the nucleating temperature, the nucleating time, the crystallizing temperature, the crystallizing time, the thermal conductivity, the coefficient of thermal expansion, the maximum variation of ΔL/L curve, which is the variation in relative length, the main crystallized phase, the source of excitation light, the wavelength of main emission when the laser oscillation is occurred by the source of excitation light, and the light transmittance at the wavelength of main emission when the glass ceramics have the thickness of 10 mm, of the glass ceramics, and the melting temperature and the melting time, of the raw materials of the original glass when the glass ceramics are produced.

TABLE III

|  | EXAMPLES | |
| --- | --- | --- |
|  | 2-1 | 2-2 |
| Composition (wt. %) |  |  |
| SiO$_2$ | 55.0 | 55.0 |
| P$_2$O$_5$ | 8.0 | 8.0 |
| Al$_2$O$_3$ | 24.0 | 24.0 |
| Li$_2$O | 4.0 | 4.0 |
| MgO | 1.0 | 1.0 |
| ZnO | 0.5 | 0.5 |
| CaO | 1.0 | 1.0 |
| BaO | 1.0 | 1.0 |
| TiO$_2$ | 2.5 | 2.5 |
| ZrO$_2$ | 2.0 | 2.0 |
| As$_2$O$_3$ | 1.0 | 1.0 |
| P$_2$O$_5$SiO$_2$(wt %/wt %) | 0.15 | 0.15 |
| Al$_2$O$_3$/SiO (wt %/wt %) | 0.44 | 0.44 |
| Ratio (wt. %) of added amount of the rare earth oxide to total amount of the others | Nd$_2$O$_3$:1.0 | Yb$_2$O$_3$:3.0 |

TABLE III-continued

| | EXAMPLES | |
|---|---|---|
| | 2-1 | 2-2 |
| Heat treatment | | |
| Nucleating temperature (° C.) | 700 | 700 |
| Nucleating time (hr) | 5 | 5 |
| Crystallizing temperature (° C.) | 780 | 780 |
| Crystallizing time (hr) | 5 | 5 |
| Thermal conductivity (W/(m·K)) | 1.7 | 1.6 |
| Coefficient of thermal expansion $\alpha \times 10^{-7}/°$ C. (−60° C. to +160° C.) | 3.0 | 5.4 |
| Maximal variation in relative length $\Delta L/L$ ($\times 10^{-5}$) | 0.65 | 0.75 |
| Main crystallized phase | β-quartz solid solution | β-quartz solid solution |
| Transmittance in thickness of 10 mm (%) (Wavelength of excitation light) | 90 (1062 nm) | 80 (1030 nm) |
| Source of excitation light | Xenon flash lamp | Xenon flash lamp |
| Wavelength of laser oscillation (nm) | 1062 | 1030 |
| Melting temperature (° C.) | 1510 | 1510 |
| Melting time (hr) | 8 | 8 |

TABLE IV

| | EXAMPLES | |
|---|---|---|
| | 2-3 | 2-4 |
| Composition (wt. %) | | |
| $SiO_2$ | 60.0 | 61.0 |
| $P_2O_5$ | 6.0 | 5.0 |
| $Al_2O_3$ | 22.5 | 22.5 |
| $Li_2O$ | 4.5 | 4.0 |
| MgO | 0.5 | 0.5 |
| ZnO | — | — |
| CaO | — | — |
| BaO | 1.0 | 1 |
| $TiO_2$ | 2.5 | 2.5 |
| $ZrO_2$ | 2.0 | 2.0 |
| $As_2O_3$ | 1.0 | 1.0 |
| $P_2O_5/SiO_2$ | 0.10 | 0.08 |
| $Al_2O_3/SiO_2$ | 0.38 | 0.37 |
| Ratio (wt. %) of added amount of the rare earth oxide to total amount of the others | $Nd_2O_3$:1.0 | $Yb_2O_3$:3.0 |
| Heat treatment | | |
| Nucleating temperature (° C.) | 780 | 800 |
| Nucleating time (hr) | 5 | 5 |
| Crystallizing temperature (° C.) | 820 | 880 |
| Crystallizing time (hr) | 5 | 5 |
| Thermal conductivity (W/(m·K)) | 1.7 | 1.6 |
| Coefficient of thermal expansion $\alpha \times 10^{-7}/°$ C. (−60°0 C. to +160° C.) | −5 | 6.2 |
| Maximal variation in relative length $\Delta L/L$ ($\times 10^{-5}$) | 0.75 | 0.60 |

TABLE IV-continued

| | EXAMPLES | |
|---|---|---|
| | 2-3 | 2-4 |
| Main crystallized phase | β-quartz solid solution | β-quartz solid solution |
| Transmittance in thickness of 10 mm (%) (Wavelength of excitation light) | 90 (1062 nm) | 80 (1030 nm) |
| Source of excitation light | Xenon flash lamp | Xenon flash lamp |
| Wavelength of laser oscillation (nm) | 1062 | 1030 |
| Melting temperature (° C.) | 1520 | 1540 |
| Melting time (hr) | 8 | 8 |

These glass ceramics according to the examples 2-1 to 2-4 are produced in analogous method to the examples 1-1 to 1-3.

The grain size of each deposited crystals in the luminous glass ceramics according to the examples 2-1 to 2-4 is not more than 800 Å. Therefore, the luminous glass ceramics have the transparency.

The luminous glass ceramics shown in Tables III and IV have the thermal conductivity of not less than 1.1 W/(m·K). The coefficients of thermal expansion thereof are within $-10 \times 10^{-7}$ to $+20 \times 10^{-7}/°$ C. and the maximal variation of $\Delta L/L$ curve thereof is not more than $2 \times 10^{-5}$, in the temperature range of −60° C. to +160° C.

It is verified that whether the luminous glass ceramics shown in Tables III and IV can be applied to the laser oscillation medium to laser oscillation or not by test as follows.

The luminous glass ceramics according to the examples 2-1 to 2-4 are processed to be rod-shaped and having a diameter of 6 mm and length of 50 mm, finely polished, and thus the glass ceramics rods for laser oscillation are obtained. Xenon flash lamp is used for the source of excitation light. A mirror on an output side, reflectance of which is 60% and a mirror on a reflection side, reflectance of which is 100% are applied to constitute a resonator. Ge photodiode is used for a detector. The laser oscillation of pulse oscillation is verified on all the luminous glass ceramics according to the examples 2-1 to 2-4 at the wavelength of laser oscillation, shown in Tables III and IV. A repetition rate of pulse is 2.5 pulse/s.

Table V shows measured results of the mechanical properties of the luminous glass ceramics according to the examples 2-1 and 1-4 and optical glass products manufactured by OHARA.

TABLE V

| | Example 2-1 | Example 1-4 | FPL53 OHARA-made glass | BSL-7 OHARA-made glass | TIH-53 OHARA-made glass |
|---|---|---|---|---|---|
| Coefficient of thermal expansion $\alpha \times 10^{-7}/°$ C. (−60° C. to +160° C.) | 3 | 47 | 163 | 86 | 102 |
| Young's modulus ($\times 10^8 N/m^2$) | 903 | 1083 | 694 | 802 | 970 |
| Poisson's ratio | 0.250 | 0.201 | 0.302 | 0.207 | 0.262 |

TABLE V-continued

|  | Example 2-1 | Example 1-4 | FPL53 OHARA-made glass | BSL-7 OHARA-made glass | TIH-53 OHARA-made glass |
|---|---|---|---|---|---|
| Flexural strength ($\times 10^6 N/m^2$) | 143 | 180 | 49 | 94 | 76 |
| $|\Delta t|$ (° C.) | 3959 | 283 | 30 | 108 | 57 |

The coefficient of thermal expansion of the luminous glass ceramics according to the example 2-1, the main crystallized phase of which is the β-quartz solid solution is exceedingly low, the flexural strength thereof is large, and the thermal shock resistance $|\Delta t|$ thereof is exceedingly high, compared with the optical glass products manufactured by OHARA as comparative examples, as shown in Table V.

The coefficient of thermal expansion of the luminous glass ceramics according to the example 1-4, the main crystal phase of which is spinel crystal is low, the flexural strength thereof is large, and the thermal shock resistance $|\Delta t|$ thereof is high, compared with the optical glass products.

That is, the thermal shock resistance $|\Delta t|$ of the comparative examples are at highest about 100° C., while the thermal shock resistance $|\Delta t|$ of the luminous glass ceramics according to the examples 2-1 and 1-4 are not less than 150° C. Therefore, it is apparent that the luminous glass ceramics according to the examples 2-1 and 1-4 have superior thermal properties.

As described above, according to the luminous glass ceramics of the invention, the luminous glass ceramics are obtained by heat treatment on the original glasses after melting of the raw materials and forming the melted mixture, wherein the glasses have a composition of $SiO_2$—$Al_2O_3$—$TiO_2$—$Re_mO_n$ system, wherein Re is one or more rare earth elements. The luminous glass ceramics do not contain the PbO component which is not preferred to the environment, and the obtained glass ceramics are close. Accordingly, the luminous glass ceramics have superior homogeneity, low thermal expansivity, heat resistance, the thermal properties such as thermal conductivity, mechanical strength, and chemical durability. Further, it is possible to drastically improve the melting property of the raw materials of the original glass with having the good valance of these superior properties of the luminous glass ceramics. Therefore, the luminous glass ceramics have superior formability and easiness of production.

In particular, according to the luminous glass ceramics of the invention, the main crystallized phase of which is the spinel crystal or the solid solution of spinel crystal, because the luminous glass ceramics do not contain the alkali components practically, it is not occurred the alkali elusion with the passage of time. Therefore, when the luminous glass ceramics are incorporated to an apparatus, the luminous glass ceramics do not lead to corrosion of the apparatus.

According to the luminous glass ceramics of the invention, because the luminous glass ceramics have small light scattering, these have superior transparency and optical homogeneity.

Therefore, the luminous glass ceramics of the invention are preferable luminous materials to be applied to such a case that it is required to be subjected to irradiation by the high-energy light, the ambient temperature is largely or rapidly changed when the glass ceramics are used, or it is required the chemical durability, or to have like. In particular, the luminous glass ceramics are preferable when transparency is required.

For example, the luminous glass ceramics of the invention can be applied to the oscillation medium for laser oscillation, the filter for excitation light, the materials for wavelength conversion, the scintillator for radiation, standard sample for fluorescent substance, the fluorescent displaying board, decorative lighting, the cover glass for the solar battery, adjusting of optical axis for an extra-high pressure mercury lamp, excimer laser or the like, the fluorescent optical fiber, the ultraviolet-to-visible ray conversion image sensor, because the luminous glass ceramics of the invention are superior in the transparency, the low thermal expansivity, the heat resistance, the thermal conductivity, and the chemical durability.

The original glasses are locally crystallized in desired portion with fine configuration by being subjected to irradiation by the laser light with desired configuration. Therefore, it is possible to further improve the decorativity of the luminous glass ceramics.

It is possible to apply the luminous glass ceramics to the fluorescent substance for illuminating or displaying and the electro luminescent materials because it is possible to control the wavelength of emission in the glass ceramics by selecting the types, amount and combination of types, of the rare earth elements. For example, the colors of luminescence is different according to the added rare earth elements and the degree of the crystallization of the deposited crystal. The starting or original glass which contains not less than three types of the rare earth elements which are emission components, the colors of emission are red, green, and blue is formed in plate shape. The original glass is locally crystallized by being subjected to irradiation by the laser light with being controlled the degree of the crystallization by changing the intensity of the laser light. Then, substrates of the luminous glass ceramic of the invention having matrix of each colors of luminescence can be obtained. It is possible to display the color image, by the substrates is subjected to irradiation by the electron beam or ultraviolet ray, which is controlled for image formation.

The luminous glass ceramics of the invention can be applied to various applications because the luminous glass ceramics have superior properties above-described. Particularly, luminous glass ceramics which have the transparency are preferable to be applied to the medium for laser, the wavelength conversion filter for excitation light, the scintillator for radiation, the cover glass for the solar battery, the fluorescent substance for illuminating or displaying, the electro luminescent materials, or the like.

According to the luminous glass ceramics of the invention, the original glass is produced by the method for producing glasses. Therefore, degree of freedom of forming is very high because the glass ceramics can be obtained by that the original glasses in various forms such as plate shape, thin plate shape, fiber shape, thin layer tube shape, or the like are formed and subsequently subjected to the heat treatment. It is also possible to apply the formed original glasses to luminous transparent glasses.

The glass ceramics can be used as powder by grinding the produced glass ceramics.

Further, after the original glass is reduced to powder, it is possible to carry out a heat treatment to crystallize. After coating a substrate or the like with the ground original glass together with a suitable binder, the original glass can be subjected to heat treatment. Therefore, it is possible to carry out the baking and crystallization at the same time.

As described above, the luminous glass ceramics have superiority of such as physical properties against the heat, ease of producing, having selectable range to be crystallized, transparentity, compared with luminous glass ceramics in earlier technology.

From the foregoing description, one skilled in the art can easily ascertain the essential characteristics of this invention, and without departing from the spirit and scope thereof, can make various changes and modifications of the invention to adapt it to various usage and conditions.

The entire disclosure of Japanese Patent Applications No. 9-353855 filed on Dec. 22, 1997 and No. 10-302584 filed on Oct. 23, 1998 including specification, claims, drawings and summary are incorporated herein by reference in their entirety.

What is claimed is:

1. A luminous glass ceramic, comprising:

a main crystallized phase selected from the group consisting of spinel and solid solution of spinel; and at least one rare earth element in a phase selected from the group consisting of a glass phase, a crystallized phase and mixtures thereof;

wherein the luminous glass ceramic having a thermal shock resistance $|\Delta t|°$ C. of not less than 150, the thermal shock resistance $|\Delta t|$ is obtained by following equation, $|\Delta t|=$(flexural strength)$\times$(1−(Poisson's ratio))/((coefficient of thermal expansion)$\times$(Young's modulus)).

2. The luminous glass ceramic as claimed in claim 1, wherein the luminous glass ceramic has a thermal conductivity of not less than 1.1 W/(m·K).

3. The luminous glass ceramic as claimed in claim 1, wherein the luminous glass ceramic is produced by a method comprising:

melting a mixture of raw materials of components of the glass ceramic;

forming the melted mixture and annealing the formed mixture;

heating the annealed product to a nucleating temperature of 650–820° C.; and heating the resulting product to a crystallizing temperature of 750–920° C.

4. The luminous glass ceramic as claimed in 1, wherein a grain size of a deposited crystal in the luminous glass ceramic is less than 300 Å, and the luminous glass ceramic has a coefficient of thermal expansion of $25\times10^{-7}$ to $85\times10^{-7}$/° C. in the temperature range of −60° C. to +160° C.

5. The luminous glass ceramic as claimed in claim 1, comprising the following components:

|  | Wt. % |
|---|---|
| $SiO_2$ | 30–65 |
| $Al_2O_3$ | 5–35 |
| MgO | 1–20 |
| BaO | 0.3–4 |
| ZnO | 5–35 |
| $TiO_2$ | 1–15 |
| $As_2O_3 + Sb_2O_3$ | 0–3 | wherein one or more rare earth elements are added to the glass ceramic on an oxide basis of 0.1–30 wt. % to an total amount of other components.

6. The luminous glass ceramic as claimed in claim 1, wherein the luminous glass ceramic is produced by a method comprising:

melting a mixture of raw materials of components of the glass ceramic;

forming the melted mixture and annealing the formed mixture;

heating the annealed product to a nucleating temperature of 650–720° C.; and heating the resulting product to a crystallizing temperature of 750–880° C.

7. The luminous glass ceramic as claimed in claim 1, wherein the luminous glass ceramic is produced by a method comprising:

melting a mixture of raw materials of components of the glass ceramic;

forming the melted mixture and annealing the formed mixture; and crystallizing a selected portion of the resulting product by a local heat-treatment.

8. The luminous glass ceramic as claimed in claim 7, wherein the local heat-treatment comprises irradiating the resulting product with a laser beam.

9. The luminous glass ceramic as claimed in claim 1, wherein the luminous glass ceramic is essentially free of $Na_2O$, $K_2O$ and PbO.

* * * * *